(12) United States Patent
McCormick et al.

(10) Patent No.: US 12,527,570 B2
(45) Date of Patent: Jan. 20, 2026

(54) TISSUE APERTURE CLOSURE DEVICE

(71) Applicant: Davol Inc., Warwick, RI (US)

(72) Inventors: Daniel F. McCormick, Bolton, MA (US); Kevin Boyle, Phoenix, AZ (US)

(73) Assignee: Davol Inc., Warwick, RI (US)

( * ) Notice: Subject to any disclaimer, the term of this patent is extended or adjusted under 35 U.S.C. 154(b) by 149 days.

(21) Appl. No.: 18/287,377

(22) PCT Filed: Apr. 30, 2021

(86) PCT No.: PCT/US2021/030037
§ 371 (c)(1),
(2) Date: Oct. 18, 2023

(87) PCT Pub. No.: WO2022/231603
PCT Pub. Date: Nov. 3, 2022

(65) Prior Publication Data
US 2024/0206870 A1 Jun. 27, 2024

(51) Int. Cl.
*A61B 17/04* (2006.01)
*A61B 17/00* (2006.01)

(52) U.S. Cl.
CPC ...... *A61B 17/0487* (2013.01); *A61B 2017/00663* (2013.01); *A61B 2017/0496* (2013.01)

(58) Field of Classification Search
CPC ...... A61B 17/0487; A61B 2017/00663; A61B 2017/0496; A61B 2017/081
See application file for complete search history.

(56) References Cited

U.S. PATENT DOCUMENTS

| | | | |
|---|---|---|---|
| 5,486,197 A | 1/1996 | Le et al. | |
| 7,959,674 B2 | 6/2011 | Shu et al. | |
| 8,187,301 B2 | 5/2012 | Lyons et al. | |
| 2007/0010832 A1* | 1/2007 | Manzo | A61B 17/0469 606/153 |
| 2007/0276437 A1 | 11/2007 | Call et al. | |
| 2009/0248028 A1 | 10/2009 | Alexander | |
| 2011/0152889 A1 | 6/2011 | Ashland | |
| 2015/0112384 A1 | 4/2015 | Hirotsuka et al. | |
| 2015/0119936 A1 | 4/2015 | Gilmore et al. | |
| 2016/0270776 A1 | 9/2016 | Miraki et al. | |

(Continued)

FOREIGN PATENT DOCUMENTS

| | | |
|---|---|---|
| JP | 2010-273933 A | 12/2010 |
| JP | 2012-024607 A | 2/2012 |

(Continued)

OTHER PUBLICATIONS

Extended European Search Report dated Nov. 18, 2024, in connection with the European Application No. 21939546.4.

(Continued)

*Primary Examiner* — Ashley L Fishback
(74) *Attorney, Agent, or Firm* — Wolf, Greenfield & Sacks, P.C.

(57) ABSTRACT

A tissue aperture closure device may include more than one suture deployed in multiple directions around a perimeter of a tissue aperture. The sutures may be pulled through a suture lock to tension the sutures and close the tissue aperture. The suture lock may be transitioned between a locked configuration and an unlocked configuration in which the tension of the sutures may be adjusted.

34 Claims, 4 Drawing Sheets

(56) References Cited

U.S. PATENT DOCUMENTS

| | | |
|---|---|---|
| 2017/0325794 A1* | 11/2017 | Willard .............. A61B 17/1227 |
| 2018/0132843 A1 | 5/2018 | Chalekson |
| 2018/0344311 A1 | 12/2018 | Gilmore et al. |
| 2019/0038276 A1 | 2/2019 | Jackson |
| 2021/0093317 A1 | 4/2021 | Miraki |

FOREIGN PATENT DOCUMENTS

| | | |
|---|---|---|
| JP | 2019-508204 A | 3/2019 |
| WO | 2020/251986 A1 | 12/2020 |

OTHER PUBLICATIONS

International Search Report and Written Opinion mailed Oct. 6, 2021 for International Application No. PCT/US2021/030037.
International Preliminary Report on Patentability mailed Nov. 9, 2023 for International Application No. PCT/US2021/030037.

* cited by examiner

TISSUE APERTURE CLOSURE DEVICE

RELATED APPLICATIONS

This Application is a national stage filing under 35 U.S.C. § 371 of International Patent Application Serial No. PCT/US2021/030037, filed Apr. 30, 2021, the content of which is incorporated herein by reference in its entirety.

FIELD

Disclosed embodiments are related to tissue aperture closure devices.

BACKGROUND

Sutures and suturing techniques may be used to close apertures formed in tissue.

SUMMARY

In some embodiments, a tissue aperture closure device comprises a suture lock and a plurality of sutures extending through the suture lock. The suture lock may be configured to maintain a length of the plurality of sutures extending out from the suture lock in a first locked configuration and to allow the plurality of sutures to be pulled through the suture lock to change the length of the plurality of sutures extending out from the suture lock in a second unlocked configuration. The suture lock may be configured to reversibly move between the first locked configuration and the second unlocked configuration.

In some embodiments, tissue aperture closure device comprises a suture lock and a plurality of sutures. Each suture of the plurality of sutures may include a first portion attached to the lock and a second portion that passes through an opening formed in the lock, wherein pulling on the second portion of the suture pulls the second portion of the suture through the lock.

In some embodiments, a method of closing an aperture formed in tissue comprises deploying a plurality of sutures around a perimeter of an aperture formed in tissue, pulling the plurality of sutures through a suture lock to shorten a length of the plurality of sutures, wherein shortening a length of the sutures closes the aperture, and locking a length of the plurality of sutures with the suture lock to maintain the shortened length of the sutures.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Suturing an aperture formed in tissue, such as a wound, trocar opening, or other opening present in the tissue of a subject, may involve attaching interrupted sutures to a perimeter of the tissue aperture and tensioning the sutures one at a time to close the tissue aperture. This may lead to excessive tension exerted on the tissue at each suture site and/or the sutures themselves, causing potential tissue damage or suture breakage. Another suturing technique may involve using a continuous suture to run a spiral stitch along a length of the tissue aperture and tensioning the suture to bring the tissue aperture together. This technique may require frequently stopping and tensioning the suture throughout the application process to prevent uneven tensioning along the length of the tissue aperture, which may be tedious and time-consuming.

In view of the above, the inventors have recognized and appreciated designs for a wound closure device that are easier to apply and/or distribute tension more evenly across a tissue aperture to prevent tissue damage and suture breakage while closing the tissue aperture. In accordance with some embodiments, the tissue aperture closure device may include a plurality of sutures that may be deployed in multiple directions from a central location such that the sutures may be attached to tissue at various locations around a perimeter of an aperture formed in tissue the sutures are attached to (e.g., forming a spiderweb or bike wheel spoke arrangement). In some embodiments, the sutures may be attached in a symmetrical pattern and/or may be equally spaced around the perimeter of the tissue aperture, but the disclosure is not so limited, and asymmetrical and unequal spacing of the sutures about the aperture formed in the associated tissue may also be used. Corresponding portions of the multiple sutures may be gathered at a location, which may be a central location relative to the aperture in the tissue, and tensioned together to bring together the tissue aperture perimeter and close the tissue aperture. Specific structures use for tensioning the sutures are detailed further below.

In some embodiments, a tissue aperture closure device may include a suture lock configured to receive a length of the multiple sutures therein. In some applications, the suture lock may be disposed in a central location relative to the aperture during use. For example, a portion of each sutures that has been attached to a tissue aperture perimeter may be pulled through the suture lock and tensioned to shorten a length of the sutures between the tissue aperture perimeter and the suture lock. As the length of each suture is reduced, the corresponding portions of the tissue aperture perimeter may be drawn inwards towards the suture lock and each other causing the tissue aperture to close. Depending on the embodiment, the sutures may be tensioned individually or simultaneously to adjust and manage the tension applied to the perimeter of the tissue aperture while closing. Once the desired tension has been achieved, the suture lock may secure and maintain a length of the sutures extending out from the suture lock to the associated portions of the tissue aperture perimeter, thus preventing the sutures from slipping through the suture lock and the tissue aperture reopening.

In some embodiments, the sutures may be attached to a perimeter of a tissue aperture at a first end and pulled through the suture lock at a second end, opposite the first end. A suture may be attached to the tissue aperture perimeter at the first end using various techniques, as further described below, and the suture may remain un-tensioned or partially tensioned until subsequent sutures have been attached to the tissue aperture perimeter. A second end of the suture, opposite the first end, may be threaded through the cord lock prior to or after the first end is attached to the tissue aperture perimeter. The second end of each suture may be pulled through the lock and each suture may be tensioned individually or simultaneously, depending on need, to shorten a length of the suture and approximate the tissue aperture perimeter. By spacing out multiple sutures around the tissue aperture perimeter, the tensile forces may be more evenly distributed around the perimeter while the tissue aperture is being tensioned and closed. Once the sutures have been properly tensioned to close the tissue aperture, the suture lock may be engaged to secure the sutures in a locked configuration.

In some embodiments, a suture lock may include a channel through which the sutures are pulled and secured. The suture lock may include multiple attachment sites positioned around a perimeter of the channel for attaching the plurality of sutures to the attachment sites. While the attachment sites may correspond to any appropriate structure, in some embodiments, the attachment sites may correspond to one or more through holes extending from a first surface of the suture lock to a second opposing surface of the suture lock that the sutures may be tied to. In some embodiments, the suture lock may include a portion with a roughly annular shape having a larger outer diameter and an inner diameter corresponding to a location of the channel extending partially or completely through the suture lock. Other shapes in which a channel extending through the suture lock with one or more suture attachment sites disposed around the channel may also be used as the disclosure is not so limited. Additionally, the attachment sites may be positioned around the channel through which the sutures may be passed using equal spacing or at various angular extents around the annulus. One or more sutures may also be attached at each attachment site.

In some embodiments, a first end portion of a suture may be attached to an attachment site on the suture lock, and a second end portion of the suture may be threaded through tissue adjacent a tissue aperture perimeter, and then returned back to the suture lock and pulled through a channel. In such embodiments, each suture may form a loop extending from a first location on the suture lock to the tissue aperture perimeter and back through a channel, such as a central channel, of the suture lock. Pulling the second end portions of the sutures back up through the central channel of the suture lock may tension the sutures and decrease a length of each loop to close the tissue aperture. The lock may be engaged to secure the sutures in a locked configuration. In some embodiments the suture lock may be in a central location of the tissue aperture with the first ends of multiple sutures attached to the suture lock at various angular positions dispersed around the lock. The second end portions of the sutures may extend radially outward from the suture lock in multiple directions to attach to various locations around the tissue aperture perimeter (e.g., bike spoke arrangement) to distribute more evenly the tensile load while tensioning the suture loops.

It should be noted that a suture may include any type of flexible fabric, fiber, or other material that may be threaded through tissue, including but not limited to, strips of mesh, ribbon, thread, filaments, or wire. The suture may be standard size suture (e.g., 2-0, 0, 1) or may have a maximum transverse dimension (e.g., a diameter or width) that is between or equal to 0.3 mm and 1 mm though sutures both greater and less than these dimension may also be used as the disclosure is not so limited. In some embodiments the suture may have various cross-sectional shapes, including flat wide cross sections (e.g., ribbon suture), square, rectangular, round, or any other appropriate shape. The suture may be made of various biocompatible materials, and may also include bioabsorbable, non-bioabsorbable, natural, and/or synthetic materials depending on the application. In some embodiments, the suture may be a monofilament, braided, woven, non-woven, or other appropriate type of material depending on the application. In some embodiments, the suture may have a solid cross-section, or hollow (tubular) cross-section, depending on the application.

In some embodiments, the plurality of sutures used with a suture lock as described herein may include multiple sutures that are joined together at a location along their length to either form a tether, or they may be attached to a separately formed tether, such that the individual sutures extend out from the tether. In such an embodiment, a first end portion of each of the multiple sutures, opposite the tethered end, may be attached to tissue around a perimeter of a tissue aperture. The tethered end may be threaded through a suture lock, or the sutures may already extend through the suture lock to the tether such that the tether may be pulled simultaneously causing tension to be applied to each suture and pulling each suture through the suture lock to shorten a length of each suture. As the end portions of each suture connected to the tissue are pulled together the tissue aperture perimeter may be closed together. The tether may be pre-threaded through the suture lock or may be threaded through the suture lock after the first end of each suture has been attached to the tissue aperture perimeter.

The inventors have further recognized and appreciated designs for a reversible suture lock that may be configured to switch between locked and unlocked configurations. In the unlocked configuration, the sutures may be pulled in one or both directions through the lock to increase or decrease a length of the sutures (i.e., to increase or decrease tension). In the locked configuration, the suture lock may secure the sutures to prevent the sutures from being pulled in one or both directions through the lock. A reversable lock that is in a locked configuration may be transitioned into an unlocked configuration to adjust the length and tension of the sutures by a user. For example, a trigger, button, slide, or other structure of the lock may be manipulated by the user to transition the lock between the locked and unlocked configuration. Once the sutures are appropriately tensioned, the lock may be transitioned back to the locked configuration. The lock may be locked and unlocked as many times as desired to reach the desired tension to close the tissue aperture. Of course, embodiments in which a lock is not unlockable are also contemplated.

The inventors have further recognized and appreciated designs for various locking mechanisms to secure a plurality of sutures in the suture lock. In some embodiments, the suture lock may allow the sutures to be pulled in opposite directions (i.e., increase or decrease tension) in an unlocked configuration and may prevent the sutures from being pulled in either direction when in the locked configuration. In one such embodiment, the suture lock may include a locking portion, such as a pin or plate, positioned within a channel of the lock that may increase or decrease a cross-sectional area of the channel. The pin or plate may move in a direction parallel to the cross-sectional area to clamp or unclamp the sutures within the channel by selectively increasing or decreasing the cross-sectional area the threads pass through. In some alternative embodiments, a suture lock may include a press fit lock or a set screw to compress the sutures together in the lock. In yet another embodiment, a lock may include barbs to engage and/or puncture the sutures. For example, when using larger sutures or sutures with large aspect rations, such as flat ribbons, the barbs may pierce through the sutures to secure the sutures in the suture lock. Alternatively, when using smaller sutures, the barbs may push into a section of the lock opposite the barbs and clamp the sutures in the suture lock.

In some embodiments a suture lock may include a one-way lock that allows the sutures to be advanced through the lock in only one direction. For example, the lock may be configured to permit the sutures to be drawn through the lock in a direction to shorten a length of the sutures extending from the lock towards the associated tissue while preventing the sutures from being pulled through the suture lock in the opposite direction to increase a length of the sutures. In such embodiments, the tension on the suture may be increased but not decreased unless the lock is disengaged. In some embodiments, the suture lock may include a ratchet spring or angled tabs that engage with the sutures to oppose the applied tensile forces on the suture and prevent slip out.

The sutures may be attached to a tissue aperture perimeter using various techniques and arrangements. In some embodiments, individual sutures may be threaded through a section of tissue using a needle and then cut and tied off. A free end portion of the suture may then be threaded through a suture lock. A suture may also include one or more barbs on a first end portion which may be used to attach the suture to tissue. In some embodiments the suture may include a loop at one end and a needle at another end. In such embodiments, the needle may pierce through the tissue and thread through the loop, creating a lasso-loop stitch. Similarly, the suture may attach to the tissue using a zip tie arrangement, in which one end of the suture pierces through the tissue and then pulls through a zip tie enclosure on the other end. Of course, other attachments may be used depending on the desired application as the disclosure is not so limited.

In some embodiments, a first end portion of the suture may be attached to a suture lock and the second end portion may be looped through the tissue aperture perimeter and threaded back up to the suture lock and pulled through a channel of the suture lock. The tissue aperture closure device may be packaged with or without the sutures pre-attached to the suture lock. If using a suture lock without pre-attached sutures, a surgeon may attach one or more sutures to an attachment site located around the lock. For example, while closing a tissue aperture, a surgeon may choose how many sutures to attach to the suture lock and where to place them based on the size and shape of the tissue aperture. In using a suture lock with pre-attached sutures, any unused sutures may be trimmed from the device once the tissue aperture is closed.

In some embodiments, the attachment sites may include one or more openings spaced around a circumference of the suture lock. The openings may be positioned around a circumference of a channel which may be formed in an annular portion of the device in some embodiments such that the sutures extend radially outward from the device when attached to the openings. Each opening may have a minimum transverse dimension (e.g., a width or diameter) that is appropriate sized and shaped to receive one or more sutures. For example, a minimum transverse dimension of the openings may be between or equal to 0.15 mm and 1.25 mm and may be shaped and sized to complement a particular suture. In some embodiments, the openings may have a dimension sized such that a needle may thread a suture through the opening. In some such embodiments, a suture may have a knotted end, or other end structure, with a transverse dimension that is larger than the inner diameter of the opening such that the end portion of the suture may not fit through and be restrained by the opening. Alternatively, the sutures may include one end with a loop and an opposite end with a needle. The looped end may be fed through the opening and the opposite end (with the needle) may be fed through the loop. As the end with the needle is pulled, the looped end will tighten itself against the suture lock, akin to a lasso. Alternatively, the sutures may be tied to the device at the openings. In some instances, it may be desirable to avoid the knots or other retaining structures used to attach the sutures to a lock from extending outwards from an exterior surface of the device. In such an embodiment, one or more recesses may be associated with the one or more openings formed in a device. The one or more recesses may be sized and shaped to receive a knot or other structure present on an end portion of a suture for fixing the suture to the device.

In embodiments where attachment sites may be positioned around a channel of a suture lock, the attachment sites may be dispersed around a perimeter of the device using equal, unequal, symmetric, and/or asymmetric spacing. In some embodiments, the number of attachment sites on the suture lock may be equal to or greater than 2, 3, 5, or 6 attachment sites. In some embodiments, the number of attachment sites on the suture lock may be equal to or less than 15, 12, 10, or 9 attachment sites. Combinations of the forgoing ranges are contemplated including a number of sutures attachment sites that are between or equal to 2 and 15. However, numbers of attachment sites both less than or greater than those noted above are also contemplated as the disclosure is not limited in this fashion.

Zero, one, or more sutures may be attached to an attachment site of a suture lock depending on the needs of a particular user for closing a tissue aperture. The shape and size of the tissue aperture may determine the optimal number, spacing, and deployment angles of the sutures on the suture lock. In some embodiments, the number of sutures deployed from the tissue aperture closure device may be equal to or greater than 2, 3, 5, or 6 sutures. In some embodiments, the number of sutures deployed from the tissue aperture closure device may be equal to or less than 15, 12, 10, or 9 sutures. The sutures may be attached to the perimeter of the tissue aperture using equal, unequal, symmetric (bilateral or radial), and/or non-symmetric spacing. In some embodiments, sutures of more than one color may be used to identify which sutures are attached to different sections of the tissue aperture perimeter.

In some embodiments, a channel extending through a suture lock that receives a plurality of sutures passing there through may have any appropriate maximum transverse dimension (e.g., a diameter or width) and/or length for receiving and selectively locking the sutures therein. For example, a length of the channel may be between or equal to 5 mm and 10 mm. The maximum transverse dimension of the channel may also be between or equal to range from 1 mm and 2 mm. While a suture lock may have any desired size and shape, in some embodiments, a maximum outer transverse dimension of a closure device including a suture lock, and channel formed therein for receiving the sutures, may be between or equal to 3 mm and 8 mm. In some embodiments, an outer maximum transverse dimension of a suture lock may be sized to fit through an inner diameter of a trocar to be used in laparoscopic techniques and procedures. However, while specific dimensions are noted above and elsewhere herein, it should be understood that the current disclosure is not limited to any particular size scale and dimensions both greater than and less than those noted above may be used as the disclosure is not limited in this fashion.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1:
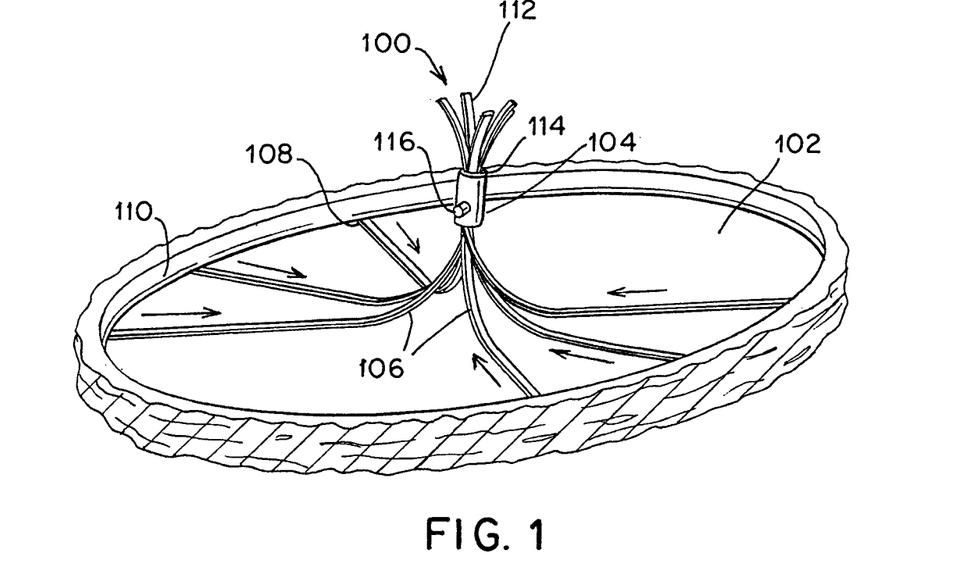
FIG. 1 is a perspective view of an embodiment of a tissue aperture closure device attached to an aperture formed in tissue.

FIG. 1 shows a schematic of an embodiment of a tissue aperture closure device 100 attached to a tissue aperture 102. The device may include a suture lock 104 and multiple sutures 106 deployed in different angular directions from the suture lock 104. A first end portion 108 of each suture may be attached to a perimeter 110 of the tissue aperture 102. As shown in FIG. 1, six sutures 106 may be attached to the perimeter 110 of the tissue aperture with two groups of three sutures 106 attached to opposites sides of the tissue aperture in a bilateral symmetrical arrangement. Although six sutures are shown in FIG. 1, the disclosure is not so limiting, and any number of sutures in various configurations and angular extents may be employed depending on the size, shape, and location of the tissue aperture.

In some embodiments, as shown in FIG. 1, a second end portion 112 of each suture 106 may be threaded through a channel 114 of the suture lock 104. As the second end portions 112 of each suture are pulled through the channel 114, a length of the sutures extending between the tissue aperture perimeter and the suture lock 104 may decrease, tensioning the sutures 106 and approximating the tissue aperture perimeter 110 together which results in the tissue aperture closing. It should be noted that in FIG. 1, the second end portions 112 of each suture 106 have not yet been pulled through the suture lock 104 to tension the sutures 106 and the tissue aperture perimeter 110.

The second end portions 112 may be pulled through the suture lock 104 simultaneously or individually to tension the sutures and bring together the tissue aperture perimeter. By deploying the sutures in multiple directions around the tissue aperture perimeter, the tension may be more evenly spread out among the sutures while the tissue aperture is closed. The tension may be adjusted and managed as desired while closing the tissue aperture to avoid applying excessively large tension around the tissue aperture and prevent suture breakage and/or tissue damage.

In some embodiments, the suture lock 104 may have a lock configured to secure the sutures 106 in the channel 114 when in a locked configuration. In some embodiments, as shown in FIG. 1, the locking device may be a press-fit or spring-loaded structure, such as a button 116, that may be configured to extend into the channel of the device to selectively clamp the sutures in the channel. When in the unlocked configuration, the button 116 may not extend into the channel 114 and the sutures 106 may be pulled in either of two, opposing directions through the channel 114. When in the locked configuration, however, the button 114, or other appropriate locking structure, may be pushed into the channel 114, clamping the sutures 106 in place within the channel and preventing the sutures from being pulled in either direction through the channel. The locking device may be engaged in the locked configuration once the desired tension of each suture has been achieved and the tissue aperture has been closed. In the locked position, the suture lock 104 may secure and maintain the tension on the sutures to keep the tissue aperture 102 closed.

In some embodiments the button 116 may be spring loaded such that it is biased into enter the channel to prevent the suture from being pulled through. Thus, a lock may be biased towards the locked configuration. In such an embodiment, pressing the button, or other appropriately configured trigger, may push the button out of the channel and allow the suture to be pulled through the channel to adjust the tension. Releasing the button may bias the button back into the channel to secure the suture. Although a button 114 is shown in FIG. 1, other locking devices may be used to secure the sutures in the suture lock. For example, a ratchet spring or other structure may be used to allow the sutures to be pulled through the lock in one direction to shorten the sutures while preventing the sutures from slipping out of the suture lock in a second direction.

Figure 2:
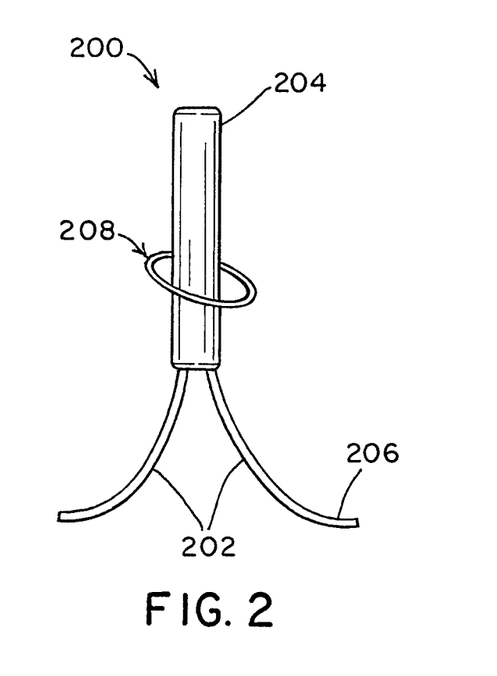
FIG. 2 is a front view of an embodiment of a tissue aperture closure device including a plurality of sutures.

In some embodiments, a tissue aperture closure device may include a suture arrangement 200 with multiple sutures 202 either combined together to form, or attached to, a tether 204 connected to a proximal portion of the individual sutures, as shown in FIG. 2. Although in FIG. 2 only two sutures 202 are shown attached to tether 204, any number of sutures 202 may be attached to the tether 204. The opposing distal end portions 206 of each suture 202 opposite the tether may be attached to a perimeter of a tissue aperture, as described above with reference to FIG. 1. In some embodiments, the tether 204 may be pulled through a suture lock 208 to tension the sutures 202 and close the tissue aperture perimeter. However, embodiments in which the sutures are either passed through the suture lock either prior to use without the tether being disposed in the channel are also contemplated. It should also be understood that a tether may be used with any of the locks described herein.

Figure 3:
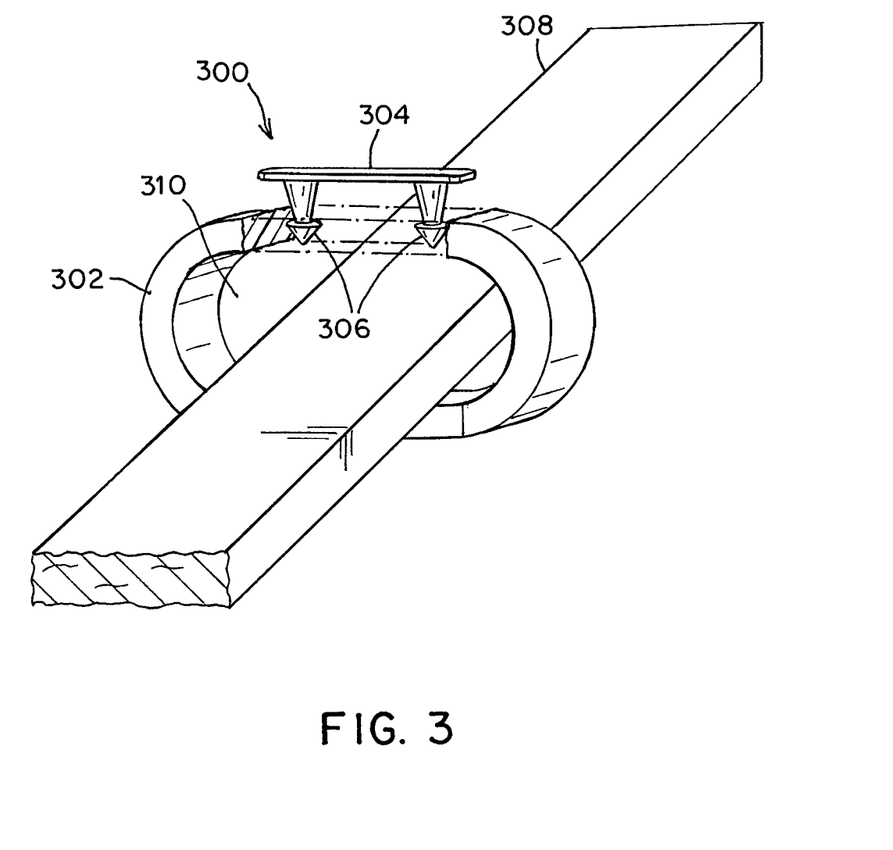
FIG. 3 is a perspective view of an embodiment of a suture lock of a tissue aperture closure device.

FIG. 3 shows a perspective view of an embodiment of a suture lock 300 that includes one or more barbed structures that may be used to lock the one or more sutures of a device in place. The lock 300 may include a ring portion 302 and one or more barbs 306 extending from a crossbar 304 in a direction toward an opening 310 of ring portion 302. The crossbar 304 may be arranged exterior to an outer perimeter of the ring portion 302 and the barbs 306 may be disposed in one or more openings (not shown) in the ring portion 302. In an unlocked configuration, as shown in FIG. 3, the barbs 306 may not extend into the opening 310 of the suture lock 300, allowing one or more sutures 308 to be pulled through the opening 310 to a desired length. The crossbar 304 may then be pushed into the ring portion 302, pushing the barbs 306 into the opening 310 to secure the sutures in a locked configuration. In some embodiments the crossbar 304 may be retracted from the opening 310 to release the suture 308 and allow the length of the suture to be adjusted.

In some embodiments, the crossbar 304 may snap into a portion of the ring portion 302 to maintain the locked configuration. The suture lock 300 may be used with various suture sizes and cross-sectional shapes, and the barbs 306 may pierce through the sutures and/or a section of the ring portion 302 opposite the crossbar 304 to maintain the locked configuration. In some embodiments, the suture 308 may have a width larger than a width between at least two barbs 306, such as the wide, flat suture 308 shown in FIG. 3, and the barbs 306 may pierce through the suture 308 as the crossbar 306 is pushed into the opening 310 to secure the suture 308 in the suture lock 300. In such embodiments, the barbs 306 may or may not also press into a section of the ring portion 302. In some embodiments, the suture 308 may include openings (not shown) that the barbs 306 may snap into to secure the suture 308 in the lock 300.

In other embodiments, the suture 308 may have a width smaller than the width between barbs 302, and the barbs 306 may pass on either side of the suture 308 as it presses into a section of the ring portion 302 opposite the crossbar 304, the crossbar 304 clamping and securing the suture 308 in the lock 300. In some embodiments, the suture lock 300 may also be used with the suture arrangement 200 in FIG. 2, with the tether 204 being pulled through the opening 310 to shorten a length of sutures 202, and the barbs 306 piercing and/or clamping the tether in the lock 300. In some embodiments, the suture lock 300 may be used with the embodiment shown in FIG. 1. In such an embodiment, button 116 may advance the crossbar 304 and barbs 306 to pierce and/or clamp the sutures within channel 114.

FIGS. 4A-4D show perspective views of a suture lock 400 according to an embodiment. The suture lock 400 may include a body 401 with a channel 402 that extends through the body 401. When used to close a tissue aperture, sutures may be threaded and pulled through the channel to tension the sutures.

In some embodiments, the body 401 may include a one or more projections 404, or other radially extending structure, that extend radially outwards from a surface of the body 401 in a direction that is approximately perpendicular to a longitudinal axis of the body of the suture lock. For example, as shown in FIGS. 4A-4D, two separate approximately flat wing like projections extend radially outwards from either side of the body. Depending on the embodiment, the one or more projections may either extend completely or partially around a perimeter of the associated body 401. The projections 404 may also have an outer diameter, or other maximum transverse dimensions, that is larger than an outer diameter of the body 401. Depending on the embodiment, the one or more projections may be closer to, or at, one end portion of the suture lock 400 relative to an opposing end portion of the suture lock. Each of the one or more projections may also include one or more suture attachment sites 406 formed in or connected to the one or more projections for attaching a first end of a suture to the suture lock 400. In some embodiments, and as shown in FIGS. 4A-4D, the attachment sites may correspond to one or more through holes 406 extending from a first surface 407 of the projection 404 to a second opposing surface of the projection, not depicted, such that the sutures may be tied to, or otherwise connected to, the through holes. In other embodiments, the attachment sites may also include other designs such as knobs or hooks that may secure an end of a suture to the suture lock 400. In some embodiments, the suture lock 400 may include six through holes 406, with three through holes formed in each projection extending out from the body with the through holes distributed along a periphery of the associated projection. However, more or fewer through holes arranged in any appropriate pattern may also be used as the disclosure is not so limited.

In some embodiments, it may be desirable to position a connection between a suture and a suture lock in a location at least partially removed from surrounding tissue. For example, a suture lock may include a recess 410 that may be sized and shaped to receive a knot, or other connecting structure used to attach the one or more sutures to the corresponding attachment feature, such as the depicted through holes 406. For example, in the depicted embodiment, the one or more projections 404 may be spaced from an adjacent end of the body 401 and one or more walls 408 may extend from an exterior portion of the one or more projections 404 in a direction that is parallel to a longitudinal axis of the channel 402 toward the adjacent end portion of the body 401. The resulting recess 410 may be located in a space between the one or more projections, the one or more walls, and an outer surface of the body 401. Depending on the embodiment, the one or more walls may extend up to or past an end of the adjacent portion of the body.

One or more sutures may be attached to one or more through holes 406 in the associated projection 404. In some embodiments a suture may include a knotted end with a diameter larger than an inner diameter of the through holes 406. Such a suture may be threaded through an insertion side of the through hole 406 such that the knotted end may be restrained on the insertion side of the through hole (i.e., within recess 410). Alternatively, the sutures may be tied onto the through holes, structures attached to the sutures may form mechanical interference connections with the through holes, and/or the sutures may be connected to the through holes or other attachment locations on the device in any other appropriate manner as the disclosure is not limited in this fashion. Additionally, the sutures may be pre-attached to the suture lock 400 prior to use or the sutures may be attached during use (i.e., while suturing a tissue aperture).

Figure 4A:
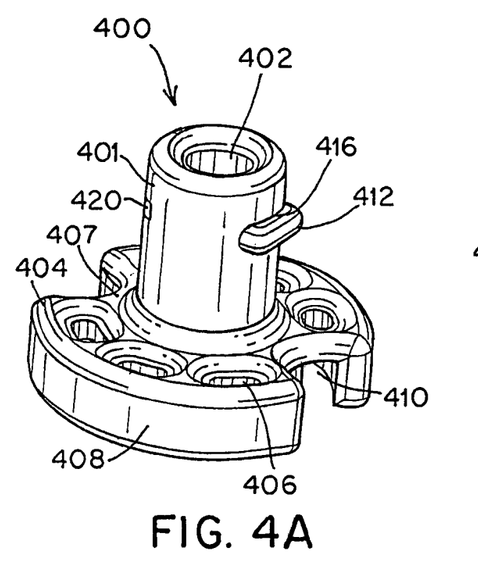
FIG. 4A is a perspective view of an embodiment of a suture lock of a tissue aperture closure device in an unlocked configuration.
Figure 4B:
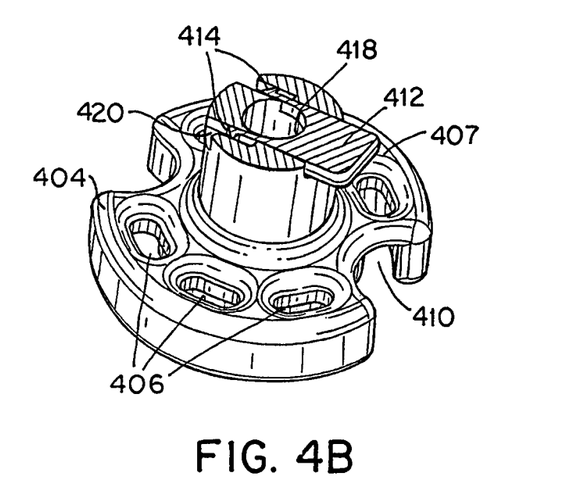
FIG. 4B is a perspective view of the suture lock in FIG. 4A with a section removed.
Figure 4C:
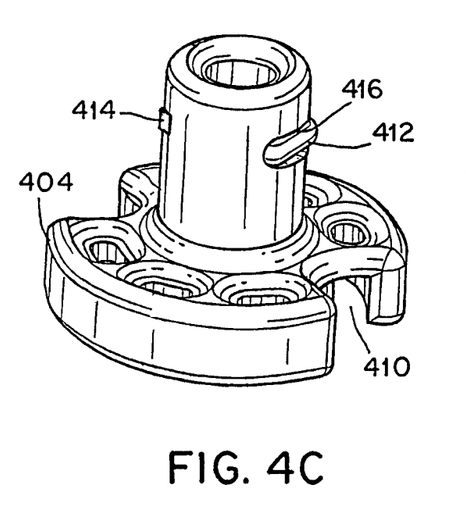
FIG. 4C is a perspective view of the suture lock in FIG. 4A in a locked configuration.
Figure 4D:
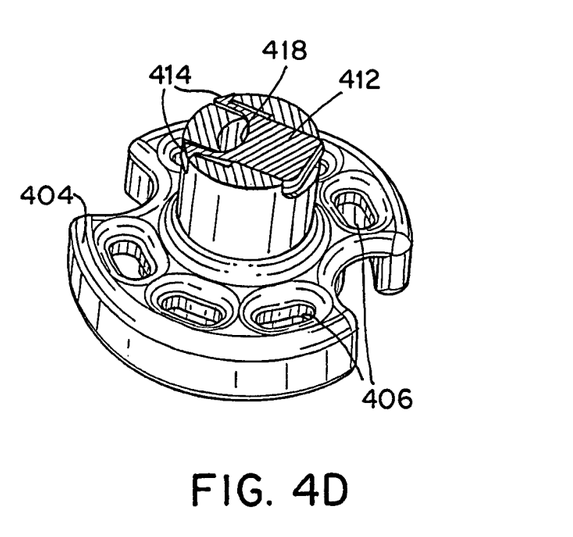
FIG. 4D is a perspective view of the suture lock in FIG. 4C in the locked configuration and with a section removed.

FIGS. 4A-4B show the suture lock in an unlocked configuration and FIGS. 4C-4D show the suture lock 400 in a locked configuration. In some embodiments, the suture lock 400 may include a button 412 that extends through a first opening 416 in the body 401 into channel 402. The button 412 may include latches 414 extending from a first side of the button 412. The latches 414 may be positioned in openings 420 that extend through the body 401 opposite opening 416. FIGS. 4B and 4D are schematics of the suture lock partially cut away to show a cross-section of the button 412 in the body 401 across the channel 402. In the unlocked configuration (FIGS. 4A and 4B), the button 412 may extend out of the body 401 through opening 416. The latches 414 may be positioned at a first end of openings 420. Each latch 414 may have a tapered ledge at an end that rests on a back surface of openings 420 to hold the button 412 in the opening 416. The button 412 may have a curved surface 418 between latches 414 that, when the lock is in the unlocked configuration (FIGS. 4A and 4B), may create an opening 418 that has the same diameter of the channel 402. In this unlocked configuration, sutures may be pulled through the channel. In the locked configuration (FIGS. 4C and 4D), button 412 may be pushed toward the center of the channel and latches 414 may be moved into locking engagement with the openings 420 to restrain the button 412 of the lock in the locked configuration. As the button 412 of the lock is depressed inwards, the inner surface 418 of the lock, which is curved in the depicted embodiment though other shapes may also be used, may be moved into an interior portion of the channel 402, thus, reducing the area of the channel 402 that the sutures are disposed in relative to this portion of the channel 402. Accordingly, the sutures may be compressed between the inner surface of the button 418 that extends into the channel and an opposing surface of the channel opposite from the button.

Figure 5A:
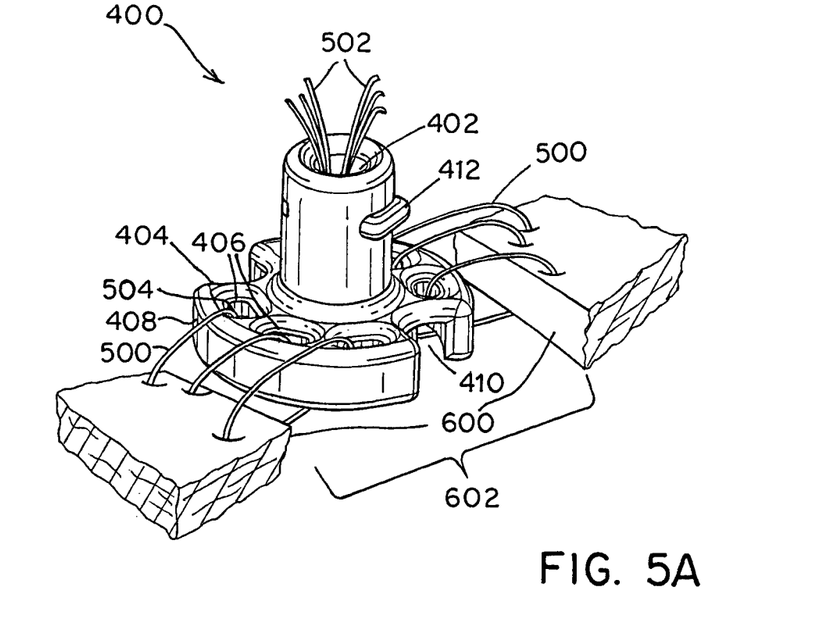
FIG. 5A is a perspective view of an embodiment of a tissue aperture closing device attached to an aperture formed in tissue.
Figure 5B:
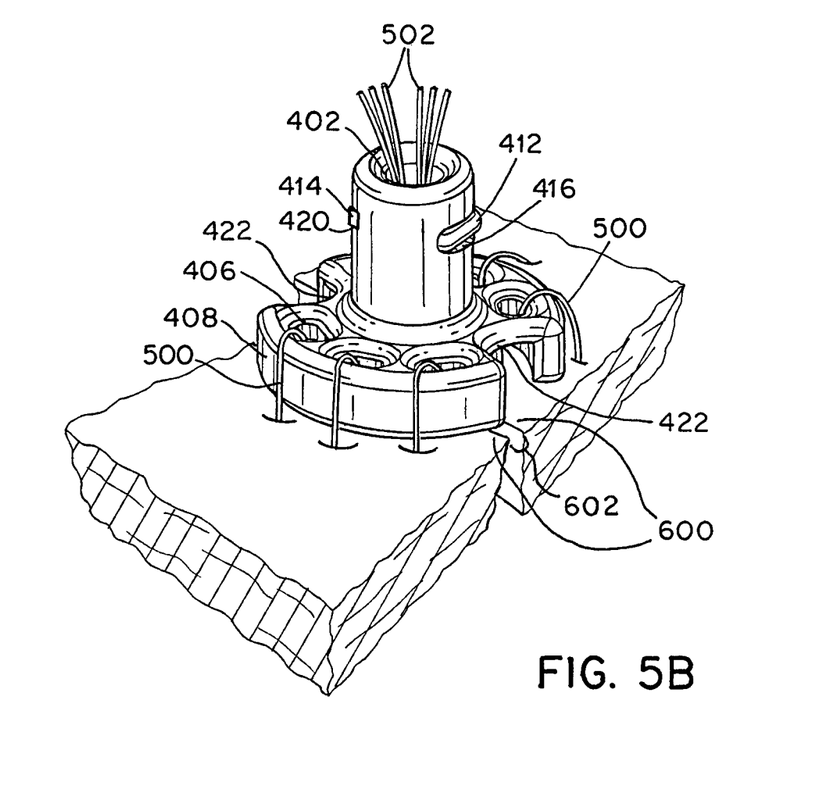
FIG. 5B is the tissue aperture closure device of FIG. 5A in which the plurality of sutures have been pulled through a suture lock to close the aperture.

FIGS. 5A-5B show a method of closing a tissue aperture using the suture lock 400 of FIGS. 4A-4D according to some embodiments. As illustrated in FIG. 5A, a plurality of sutures 500 may be attached to a suture lock 400 and to a perimeter 600 of a tissue aperture to be closed by the device. The sutures 500 may be attached using the following method, although other methods may be used as the disclosure is not so limiting. A first end 502 of a suture 500 may be threaded through a through hole 406 on the projection 404 in an upward direction relative to the depicted orientation such that the suture passes from within recess 410 through the associated opening. In some embodiments, one suture 500 may be attached to each of the six through holes 406. The associated suture 500 may be pulled through the through hole 406 until a knot (not shown) at a second end 504 of the suture, opposite the first end 502, abuts an inner surface of the through hole 406 adjacent recess 410. The knot, or other appropriately sized structure on an end portion of the suture, may have a transverse dimension that is larger than the associated through hole 406 such that the retaining feature is disposed within the recess 410 and held in place by the associated opening.

A first end portion 502 of each suture may be passed through a corresponding portion of tissue adjacent a tissue aperture perimeter 600 by piercing a first surface of the tissue and exiting the tissue at a second surface. The first surface of the tissue may be a surface orientated away from the underlying tissue, proximate to the suture lock 400, and may be approximately parallel to a plane of the through holes. The second surface of the tissue may be approximately parallel or perpendicular to the first surface depending on the thickness of the tissue as well as a shape and size of the tissue aperture. As shown in the embodiment of FIGS. 5A and 5B, the second surface may be opposite and approximately parallel to the first surface and positioned at a farther distance from the suture lock 400 than the first surface. In some embodiments, as illustrated, three sutures may be attached to opposite sides of the tissue aperture perimeter 600. The sutures 500 on opposite sides of the tissue aperture perimeter may have different colors to identify the sutures. The first end portion 502 of each suture may be looped back to the suture lock 400 and threaded through a bottom opening of the channel 402 disposed on a bottom surface of the suture lock 400 that is configured to be oriented towards the underlying tissue during use. In this manner, each suture 500 may form a suture loop between the suture lock 400 and the tissue aperture perimeter 600. As shown in FIG. 5A, the sutures may have been threaded through the channel 402, but the sutures 500 may not yet have been pulled to decrease a length of the suture loop to tension the sutures 500. The tissue aperture may have a diameter 600 prior to tension being applied to bring together the tissue aperture perimeter 600. A button 412, or other appropriate lock, may be in the unlocked configuration to allow the sutures 500 to be pulled through the channel 402 in either direction.

FIG. 5B shows the tissue aperture closure device after the sutures 500 have been pulled through the channel 402 of the suture lock 400 to tension the sutures 500 and decrease a length of the loops. As the loops decrease in length, tensile forces will bring the tissue aperture perimeter 600 together, decreasing the tissue aperture diameter 602. As the length of the loops decrease, causing the tissue aperture diameter 602 to decrease, a bottom surface of the suture lock 400 may rest on the first surface of the tissue the suture lock is disposed on and the closed tissue aperture. The knots, or other retention structures connected to the second end portions 504 of the sutures may be received in the recess 410 such that the knots, or other structures, do not contact the tissue surface when in the final closed configuration which may help to prevent irritation of the tissue or tissue aperture perimeter 600. The suture lock 400 may include cutouts 422 between projections 404 to enable the user to visualize the progress during the aperture closure.

Once the desired tension and tissue aperture diameter 602 have been achieved, the button 412 may be pressed into the channel 402 in a locked configuration to compress the sutures 500 against an inner surface of the channel 402 and lock the suture lengths as described above. For example, one or more latches 414 on the press-fit button may be pushed through opening 420 and engage an outer surface of the channel 402 to maintain the button 412 in the locked configuration. In this manner, the suture lock may maintain the length and the tensile forces applied to the sutures 500 to maintain the tissue aperture in the desired closed configuration.

Although a press-fit button 412 has been described with reference to FIGS. 5A-5B, various locking mechanisms may be employed to secure the sutures in the channel 402. In some embodiments, the suture lock 400 may include a reversable lock, such as a spring-loaded button biased towards the locked configuration that may allow the suture lock to switch between locked and unlocked configurations. In this manner, the tension of the sutures 500 may be adjusted and readjusted as necessary during and after closing a tissue aperture.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A tissue aperture closure device comprising:
a suture lock;
a plurality of sutures extending through the suture lock, wherein a first portion of each suture of the plurality of sutures is configured to be attached to tissue, and wherein the suture lock is configured to maintain a length of the plurality of sutures extending out from the suture lock in a first locked configuration and to allow the plurality of sutures to be pulled through the suture lock to change the length of the plurality of sutures extending out from the suture lock in a second unlocked configuration, and wherein the suture lock is configured to reversibly move between the first locked configuration and the second unlocked configuration;
a plurality of openings positioned around a perimeter of the suture lock configured to secure the plurality of sutures to the tissue aperture closure device; and
a channel configured to receive the plurality of sutures, and wherein the suture lock is configured to engage the plurality of sutures in the channel to lock the sutures in the locked configuration.

2. The tissue aperture closure device of claim 1, wherein each suture of the plurality of sutures includes a second portion attached to the lock and a third portion that passes through an opening formed in the lock, wherein pulling on the third portion of the suture pulls the third portion of the suture through the lock.

3. The tissue aperture closure device of claim 1, wherein the plurality of sutures are connected to a tether, and wherein the tether is configured to be pulled to pull the plurality of sutures simultaneously.

4. The tissue aperture closure device of claim 1, wherein each suture of the plurality of sutures is configured to be individually pulled through the suture lock.

5. The tissue aperture closure device of claim 1, wherein the suture lock is configured to allow the plurality of sutures to be pulled through the suture lock in only one direction.

6. The tissue aperture closure device of claim 1, wherein the suture lock includes a button to secure the plurality of sutures in the locked configuration.

7. The tissue aperture closure device of claim 1, wherein the suture lock includes barbs configured to pierce the plurality of sutures to secure the plurality of sutures in the locked configuration.

8. The tissue aperture closure device of claim 1, wherein the suture lock is biased to the locked configuration.

9. A tissue aperture closure device comprising:
a suture lock;
a plurality of sutures, wherein each suture of the plurality of sutures includes a first portion attached to the lock and a second portion that passes through an opening formed in the lock, wherein pulling on the second portion of the suture pulls the second portion of the suture through the lock;
a plurality of openings positioned around a perimeter of the suture lock configured to secure the plurality of sutures to the tissue aperture closure device; and
a channel configured to receive the plurality of sutures, and wherein the suture lock is configured to engage the plurality of sutures in the channel to lock the sutures in the locked configuration.

10. The tissue aperture closure device of claim 9, wherein the plurality of sutures are connected to a tether, and wherein the tether is configured to be pulled to pull the plurality of sutures simultaneously.

11. The tissue aperture closure device of claim 9, wherein each suture of the plurality of sutures is configured to be individually pulled through the suture lock.

12. The tissue aperture closure device of claim 9, wherein the suture lock is configured to allow the plurality of sutures to be pulled through the suture lock in only one direction.

13. The tissue aperture closure device of claim 9, wherein the suture lock includes a button to secure the plurality of sutures in the suture lock.

14. The tissue aperture closure device of claim 9, wherein the suture lock includes barbs configured to pierce the plurality of sutures to secure the plurality of sutures in the suture lock.

15. The tissue aperture closure device of claim 9, wherein the suture lock is biased to a locked configuration.

16. The tissue aperture closure device of claim 9, wherein the plurality of openings are symmetrically dispersed around the perimeter of the suture lock.

17. A method of closing an aperture formed in tissue, the method comprising:
deploying a plurality of sutures around a perimeter of an aperture formed in tissue;
pulling the plurality of sutures through a suture lock to shorten a length of the plurality of sutures, wherein shortening a length of the sutures closes the aperture, wherein the suture lock includes a channel configured to receive the plurality of sutures and a plurality of openings positioned around a perimeter of the suture lock to secure the plurality of sutures; and
locking a length of the plurality of sutures by engaging the plurality of sutures in the channel with the suture lock to maintain the shortened length of the sutures.

18. The method of claim 17, wherein maintaining the shortened length of the sutures maintains the aperture in a closed configuration.

19. The method of claim 17, further comprising releasing the plurality of sutures.

20. The method of claim 19, further comprising adjusting the length of the plurality of sutures.

21. The method of claim 17, wherein deploying the plurality of sutures comprises deploying three or more sutures.

22. The method of claim 17, further comprising attaching a first portion of each of the plurality of sutures to the suture lock, and passing a second portion of each of the plurality of sutures through the channel of the suture lock, wherein pulling on the second portion pulls the second portion of the suture through the lock.

23. The method of claim 17, further comprising inserting an end portion of each of the plurality of sutures into the lock.

24. The method of claim 17, wherein pulling the plurality of sutures through the lock comprises pulling the plurality of sutures individually.

25. The method of claim 17, wherein the plurality of sutures are connected to a tether, and wherein pulling the plurality of sutures includes pulling the tether to pull the plurality of sutures simultaneously.

26. The method of claim 17, wherein deploying the plurality of sutures comprises dispersing the plurality of sutures evenly around the perimeter of the aperture.

27. A tissue aperture closure device comprising:
a suture lock;
a plurality of sutures extending through the suture lock, wherein a first portion of each suture of the plurality of sutures is configured to be attached to tissue, and wherein the suture lock is configured to maintain a length of the plurality of sutures extending out from the suture lock in a first locked configuration and to allow the plurality of sutures to be pulled through the suture lock to change the length of the plurality of sutures extending out from the suture lock in a second unlocked configuration; and
a tether, wherein the plurality of sutures are connected to the tether, and wherein pulling the tether pulls the plurality of sutures simultaneously.

28. The tissue aperture closure device of claim 27, wherein the suture lock is configured to allow the plurality of sutures to be pulled through the suture lock in only one direction.

29. The tissue aperture closure device of claim 27, wherein the suture lock includes a button to secure the plurality of sutures in the locked configuration.

30. The tissue aperture closure device of claim 27, wherein the suture lock is biased to the locked configuration.

31. A method of closing an aperture formed in tissue, the method comprising:
deploying a plurality of sutures around a perimeter of an aperture formed in tissue;

pulling the plurality of sutures through a suture lock to shorten a length of the plurality of sutures, wherein shortening a length of the sutures closes the aperture; and locking a length of the plurality of sutures with the suture lock to maintain the shortened length of the sutures, wherein the plurality of sutures are connected to a tether, and wherein pulling the plurality of sutures includes pulling the tether to pull the plurality of sutures simultaneously.

32. The method of claim 31, wherein maintaining the shortened length of the sutures maintains the aperture in a closed configuration.

33. The method of claim 31, further comprising releasing the plurality of sutures.

34. The method of claim 33, further comprising adjusting the length of the plurality of sutures.

\* \* \* \* \*